United States Patent
Kruglick (10) Patent No.: US 9,575,534 B2
(45) Date of Patent: Feb. 21, 2017

(54) DEVICE USAGE MESSAGE GENERATOR INDICATIVE OF POWER CONSUMPTION OF AN ELECTRONIC DEVICE

(71) Applicant: EMPIRE TECHNOLOGY DEVELOPMENT LLC, Wilmington, DE (US)

(72) Inventor: Ezekiel Kruglick, Poway, CA (US)

(73) Assignee: Empire Technology Development LLC, Wilmington, DE (US)

( * ) Notice: Subject to any disclaimer, the term of this patent is extended or adjusted under 35 U.S.C. 154(b) by 77 days.

(21) Appl. No.: 14/391,640

(22) PCT Filed: Mar. 18, 2014

(86) PCT No.: PCT/US2014/031021
§ 371 (c)(1),
(2) Date: Oct. 9, 2014

(87) PCT Pub. No.: WO2015/142319
PCT Pub. Date: Sep. 24, 2015

(65) Prior Publication Data
US 2015/0362969 A1 Dec. 17, 2015

(51) Int. Cl.
*G06F 1/00* (2006.01)
*G06F 15/16* (2006.01)
(Continued)

(52) U.S. Cl.
CPC ............ *G06F 1/28* (2013.01); *H04L 12/12* (2013.01); *H04L 51/32* (2013.01); *H04L 67/125* (2013.01); *Y02B 60/34* (2013.01)

(58) Field of Classification Search
CPC .................................................... G06F 1/3203
(Continued)

(56) References Cited

U.S. PATENT DOCUMENTS 6,363,265 B1    3/2002   Ritter
6,989,731 B1 *   1/2006   Kawai et al. .................. 340/3.1
(Continued)

FOREIGN PATENT DOCUMENTS

WO      2009146250 A1    12/2009

OTHER PUBLICATIONS

"7 Tools to Automate Your Social Media Management," Accessed at http://web.archive.org/web/20131212140326/http://workawesome.com/software/social-media-management/, Accessed on Sep. 16, 2014, pp. 3.

(Continued)

*Primary Examiner* — Suresh Suryawanshi
(74) *Attorney, Agent, or Firm* — Morritt Hock & Hamroff LLP; Steven S. Rubin, Esq.

(57) ABSTRACT

Technologies are generally described for systems, devices and methods effective to generate a message that may be sent to a social network. Power information from an electronic device may be detected by a power detector and received by a processor. For example, a power consumption profile of an appliance may be detected. The processor may classify the power information to produce descriptive data. For example, the processor may determine that an oven has been turned on for a period of time. The processor may generate the message by applying one or more rules to the descriptive data. For example, the processor may generate a message relating to consumption of dinner based on the determination that the oven has been turned on.

20 Claims, 6 Drawing Sheets

(51) Int. Cl.
G06F 1/28 (2006.01)
H04L 12/12 (2006.01)
H04L 12/58 (2006.01)
H04L 29/08 (2006.01)

(58) Field of Classification Search
USPC .......................................................... 713/310
See application file for complete search history.

(56) References Cited

U.S. PATENT DOCUMENTS

| | | | | |
|---|---|---|---|---|
| 8,060,602 | B2* | 11/2011 | Singh et al. ................... | 709/224 |
| 8,271,147 | B2* | 9/2012 | Beal et al. .................... | 700/295 |
| 8,316,413 | B2* | 11/2012 | Crabtree ....................... | 725/141 |
| 8,489,657 | B2 | 7/2013 | Shepherd et al. | |
| 2006/0218244 | A1 | 9/2006 | Rasmussen et al. | |
| 2010/0223341 | A1* | 9/2010 | Manolescu et al. .......... | 709/206 |
| 2012/0124176 | A1 | 5/2012 | Curtis et al. | |
| 2012/0149345 | A1 | 6/2012 | Jotanovic | |
| 2014/0309963 | A1* | 10/2014 | Tsukamoto ............ | G01C 21/12 |
| | | | | 702/150 |

OTHER PUBLICATIONS

"Demand Response Programs," Accessed at http://regarchive.sdge.com/aboutus/longterm/longtermDemandResponse.shtml, Accessed on Sep. 16, 2014, pp. 2.

"Summer Saver Program," Accessed at http://web.archive.org/web/20140811141244/http://www.sdge.com/save-money/summer-saver-program, Accessed on Sep. 16, 2014, pp. 3.

"Telemetry scenario: Home energy monitoring and control," Accessed at http://www-01.ibm.com/support/knowledgecenter/SSFKSJ_7.1.0/com.ibm.mq.doc/tt10200_.htm, Accessed on Sep. 16, 2014, pp. 3.

"The "Smart Grid Social Network"," Accessed at http://web.archive.org/web/20140916065031/http://psc.ky.gov/agencies/psc/Chairman_Forum/John_McDonald/SG%20Social%20Network_John%20McDonald.pdf, Accessed on Sep. 16, 2014, p. 1.

Alizadeh, M. et al., "Direct load management of electric vehicles," IEEE International Conference on Acoustics, Speech and Signal Processing, pp. 5964-5967 (2011).

Alizadeh, M., A. et al., "From Packet to Power Switching: Digital Direct Load Scheduling," IEEE journal of Selected Areas in Communications (JSAC), pp. 1-10 (2012).

Cole, A. I., and Albicki, A., "Algorithm for Nonintrusive Identification of Residential Appliances," Proceedings of the 1998 IEEE International Symposium on Circuits and Systems, vol. 3, pp. 338-341 (1998).

Drenker, S., and Kader, A, "Nonintrusive Monitoring of Electric Loads," IEEE Computer Applications in Power, vol. 12, No. 4, pp. 47-51 (1999).

Freshenbacher, K., "Cisco: Social networks are the third leg of the smart grid," Accessed at http://web.archive.org/web/20130307100816/http://gigaom.com/2011/09/27/cisco-social-networks-are-the-third-leg-of-the-smart-grid/, Posted on Sep. 27, 2011, pp. 4.

Gkatzikis, L., I. et al., "The Role of Aggregators in Smart Grid Demand Response Markets," IEEE Journal on Selected Areas in Communications, vol. 31, No. 7, pp. 1247-1257 (2013).

Hart, G. W., "Nonintrusive Appliance Load Monitoring," Proceedings of the IEEE, vol. 80, No. 12, pp. 1870-1891 (1992).

International Search Report and Written Opinion in International Patent Application No. PCT/US2014/031021 mailed Aug. 22, 2014, 11 pages.

Knott, J., "Powerline Leading Smart Grid Appliance Protocol," Accessed at http://web.archive.org/web/20110628174224/http://www.cepro.com/article/powerline_leading_smart-grid_appliance_protocol/, Posted on Mar. 8, 2011, pp. 4.

Prudenzi, A., "A Neuron Nets Based Procedure for Identifying Domestic Appliances Pattern-of-use from Energy Recordings at Meter Panel," IEEE Power Engineering Society Winter Meeting, vol. 2, pp. 941-946 (2002).

* cited by examiner

FIG. 6 under 35 U.S.C. §371 of International Application No. PCT/US14/031021 filed Mar. 18, 2014, the entirety of which is hereby incorporated by reference.

DEVICE USAGE MESSAGE GENERATOR INDICATIVE OF POWER CONSUMPTION OF AN ELECTRONIC DEVICE

CROSS-REFERENCE TO RELATED APPLICATION

This application is a U.S. national stage filing under 35 U.S.C. §371 of International Application No. PCT/US14/031021 filed Mar. 18, 2014, the entirety of which is hereby incorporated by reference.

BACKGROUND

Unless otherwise indicated herein, the materials described in this section are not prior art to the claims in this application and are not admitted to be prior art by inclusion in this section.

Appliances and other electronics may be equipped with network technology and may be capable of communicating with one another. Additionally, devices equipped with networking technology may allow for communication with a power grid. Use of some devices may be detected by analyzing a power consumption profile used by the device.

SUMMARY

In some examples, message generators are generally described. Various message generators may include a processor. Message generators may include a power detector configured to be in communication with the processor. In further examples, message generators may include a memory configured to be in communication with the processor. The memory may be effective to store instructions. In examples including a power detector, the power detector may be effective to detect power information from an electronic device. The power detector may be further effective to send the power information to the processor. The processor may be effective to classify the power information, in response to the instructions stored in the memory, to produce descriptive data about the power information. The processor may be effective to apply one or more rules to the descriptive data to generate the message.

In some other examples, methods for generating a message are generally described. In various examples, the methods may include detecting, by a power detector, power information from an electronic device. The methods may include receiving, by a processor, the power information from the power detector. The methods may include classifying, by the processor, the power information to produce descriptive data. The methods may include generating, by the processor, the message by applying one or more rules to the descriptive data.

In some examples, methods for generating content based on power information are generally described. The methods may include detecting, by a power detector, the power information from an electronic device. Some example methods may include classifying, by a processor, the power information to produce descriptive data. The methods may further include applying, by the processor, one or more rules to the descriptive data. The methods may further include identifying, by the processor, an activity based on the application of the one or more rules to the descriptive data. The methods may further include sending, by the processor, an indication of the activity to a content server configured to be in communication with the processor. The methods may include receiving, by the processor from the content server, content related to the activity.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. The aspects of the present disclosure, as generally described herein, and illustrated in the drawings, can be arranged, substituted, combined, separated, and designed in a wide variety of different configurations.

This disclosure is generally drawn to, inter alia, methods, apparatus, systems, devices, and computer program products related to a device usage message generator.

Briefly stated, technologies are generally described for systems, devices and methods effective to generate a message that may be sent to a social network. Power information from an electronic device may be detected by a power detector and received by a processor. For example, a power consumption profile of an appliance may be detected. The processor may classify the power information to produce descriptive data. For example, the processor may determine that an oven has been turned on for a period of time. The processor may generate the message by applying one or more rules to the descriptive data. For example, the processor may generate a message relating to consumption of dinner based on the determination that the oven has been turned on.

Figure 1:
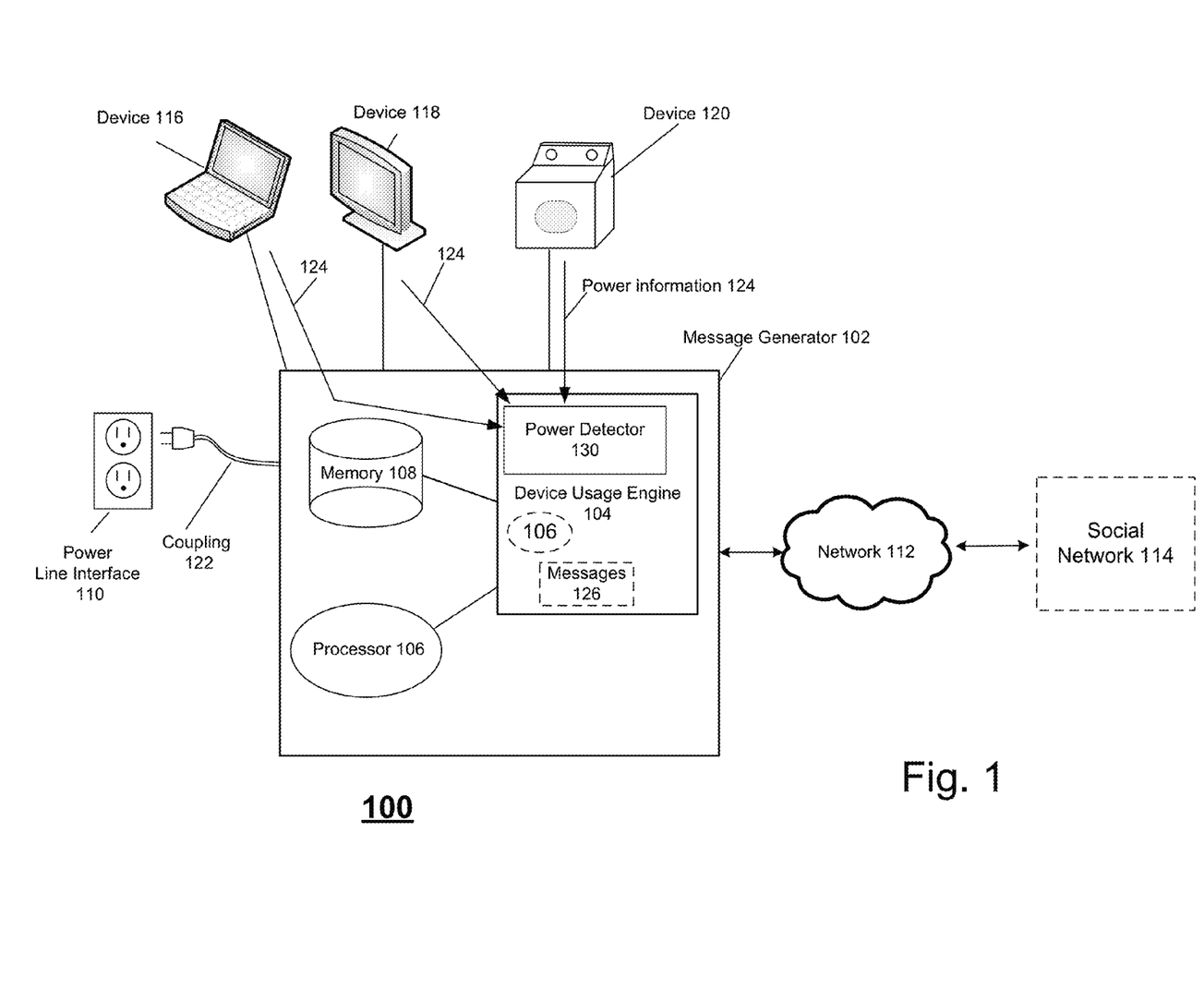
FIG. 1 illustrates an example system that can be utilized to implement a device usage message generator.

FIG. 1 illustrates an example system 100 that can be utilized to implement a device usage message generator, arranged in accordance with at least some embodiments described herein. System 100 may include a message generator 102 and a power line interface 110 such as an outlet. Message generator 102 may be coupled to power line interface 110 through a coupling 122. Coupling 122 may be a power line capable of transmitting power and/or data. Power line interface 110 may be one or more power outlets or other interfaces coupled to a power grid. Devices 116, 118 and/or 120 may be configured to be in communication with message generator 102. Message generator 102 may be configured to be in communication with a social network 114 over a network 112. Network 112 may be, for example, the Internet, a cellular network, etc. Although three devices are described and depicted, any number of devices may be used with system 100.

Devices 116, 118 and 120 may be electrically powered. In some examples, devices 116, 118 and 120 may be one or more home appliances, computing devices, televisions, washing machines, electric ovens, gas ovens with electronic control systems, refrigerators, freezers, air conditioners, heaters, business machines, lighting, water heaters, etc. In some examples, one or more of devices 116, 118 and/or 120 may be capable of communicating over a network. In some examples, devices 116, 118 and/or 120 may communicate via power-lines and/or wirelessly through a ZIGBEE, Open ADR (automated demand response), IEEE (Institute of Electrical and Electronics Engineers) 802.11, or other communication protocols. For example, devices 116, 118 and 120 may transmit information to and/or receive information from, other networked devices. The information may be related to load requirements, power consumption, device specifications, operational states and/or other information related to a device or power grid performance. In various other examples, one or more of devices 116, 118 and/or 120 may be without integrated networking technology.

Message generator 102 may include a memory 108, a processor 106, and/or a device usage engine 104, at least some of which may be configured to be in communication with one another. Device usage engine 104 may include a power detector 130. Power detector 130 may be hardware configured to receive power information from one or more of devices 116, 118, 120 and/or other devices. Power detector 130 may be configured to transmit and receive wired and/or wireless signals. Power detector 130 may be configured to be in communication with processor 106. Device usage engine 104 may be implemented as hardware or as some combination of hardware and instructions executable on the hardware. Power detector 130 may be configured to detect power information 124 generated by devices 116, 118, and/or 120. Power detector 130 may send power information 124 to processor 106. As discussed in more detail below, based on power information 124 received from devices 116, 118 and/or 120 and instructions stored in memory 108, device usage engine 104 may generate one or more messages 126. For example, messages 126 may include status updates or other information related to power information 124 which may be visible to users of social network 114. Messages 126 may be sent over network 112 (e.g., the Internet) to social network 114. In an example, messages 126 may be integrated into a user profile of social network 114. In a further example, messages 126 may be broadcast to other users of social network 114. Social network 114 may be for example, a social media service such as FACEBOOK, TWITTER, INSTAGRAM, TUMBLR, etc.

Figure 2:
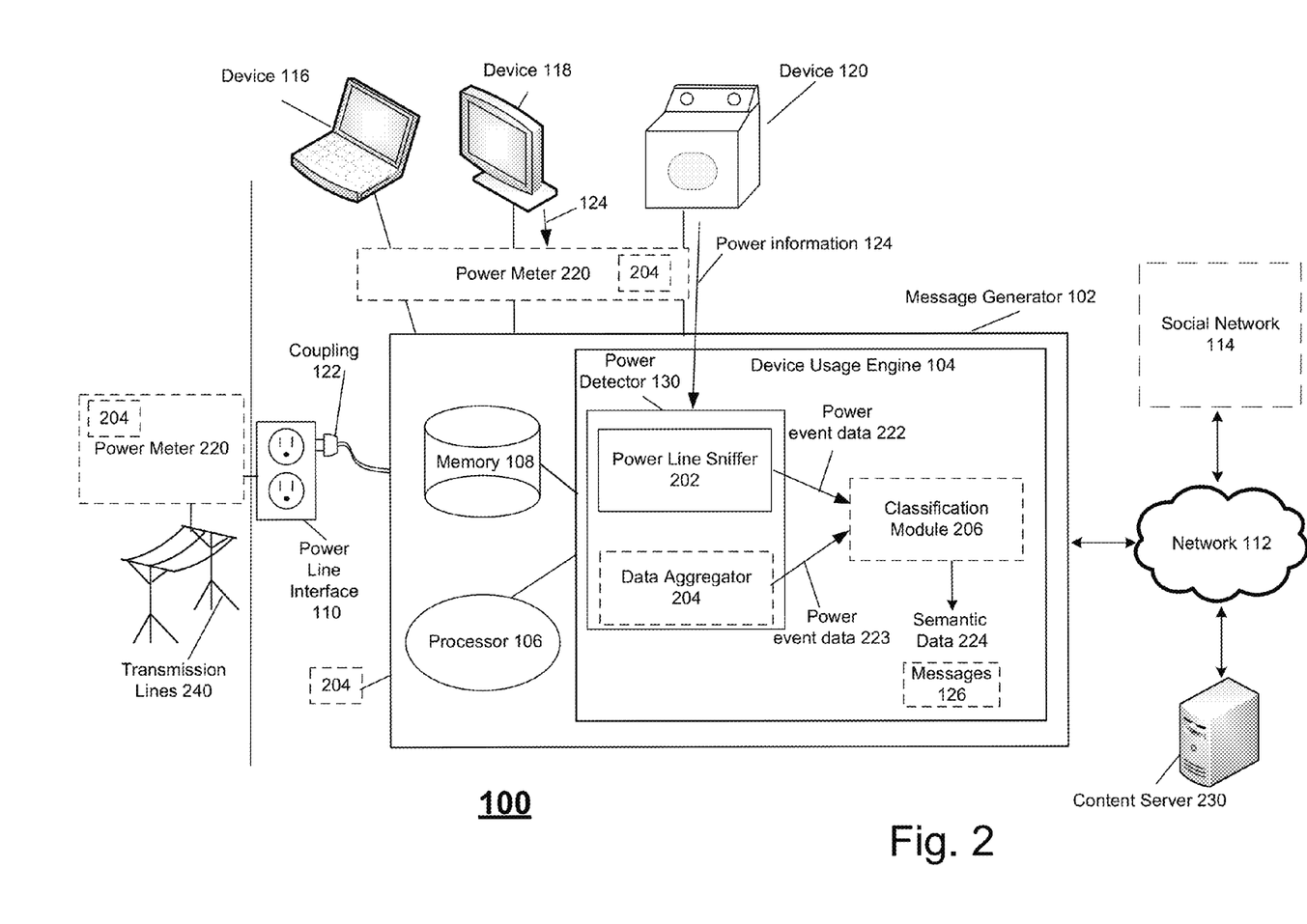
FIG. 2 depicts the example device usage message generator of FIG. 1 with details relating to a device usage engine.

FIG. 2 depicts example device usage message generator 102 with details relating to a device usage engine 104, arranged in accordance with at least some embodiments described herein. Those components in FIG. 2 that are labeled identically to components of FIG. 1 will not be described again for the purposes of clarity and brevity.

Device usage engine 104 may further include a classification module 206. Power detector 130 may include a power line sniffer 202 and/or a data aggregator 204. Power line sniffer 202 and data aggregator 204 may be configured to receive power information 124 related to one or more devices configured to be in communication with system 100. Power line sniffer 202 may be configured to be in communication with classification module 206. In an example, power line sniffer 202 may be coupled to the electrical system of a building such as through coupling 122. Power line sniffer 202 may receive power information 124 related to devices 116, 118, and/or 120. Power line sniffer 202 may detect power information 124 which may include one or more digital and/or analog power signals related to power consumption, load requirements, device specifications, operational states and/or other information related to devices 116, 118 and/or 120. In an example, device 120 may be without networking technology. Power line sniffer 202 may detect power information 124 via power lines such as through wired ZIGBEE, Open ADR, IEEE 802.11 and/or other communication protocols wired or wireless. Power information 124 may include one or more digital and/or analog power signals related to power consumption, load requirements, device specifications, operational states and/or other information related to device 120. In an example, power information 124 may include one or more analog power signals that represent a characteristic inductive ringing and/or a characteristic impulse response of device 120.

Power line sniffer 202 may detect power information 124 generated by devices 116, 118 and/or 120 even in examples where devices 116, 118 and/or 120 lack networking technology. Power line sniffer 202 may be capable of identifying a particular device based on a power consumption profile in power information 124 such as through the use of Demand Side Management Type signals or Digital Direct Load Scheduling Strategies. In another example, a power meter 220 may receive power information 124 from one or more of devices 116, 118 and/or 120. Power meter 220 may be capable of identifying a particular device based on a power consumption profile in power information 124 such as through the use of power line signaled reports, Demand Side Management Type signals, or Digital Direct Load Scheduling Strategies. Power meter 220 may provide power information 124 to power detector 130 in a digital format. Power meter 220 may be, for example, a power management system configured to receive information from networked devices based on power consumption profiles and/or broadcasted digital data. In some examples, power meter 220 may be installed in an electrical system at a point between devices 116, 118, and/or 120 and message generator 102. In another example, power meter 220 may be installed between power line interface 110 and transmission lines 240 such as in a fuse box.

Data aggregator 204 may be implemented as hardware and/or as combination of hardware and instructions executable on the hardware. Data aggregator 204 may be located within power detector 130 or at a location external to power detector 130. In an example, data aggregator 204 may be located externally from message generator 102 and may aggregate power information 124 from two or more locations in a power grid. Data aggregator 204 may be configured to be in communication with classification module 206. In another example, data aggregator 204 may be located within power meter 220. In examples where devices 116, 118, and/or 120 are capable of communicating with other devices over a network, devices 116, 118, and/or 120 may broadcast power information 124 that includes digital data related to power consumption and/or device identification. Data aggregator 204 may receive power information 124 broadcast from devices 116, 118 and/or 120. In an example, device 116 may be capable of communicating with other devices over power lines and/or another network. Device 116 may broadcast or otherwise transmit power information 124 that includes digital data representing a device serial number (e.g. washing machine ABC) and/or rates of power consumption. Data aggregator 204 may receive power information 124 from device 116.

Power line sniffer 202 may provide power event data 222 to classification module 206. Data aggregator 204 may provide power event data 223 to classification module 206. Power event data 222 and power event data 223 may include identities and/or power consumption data for devices 116, 118 and/or 120. In an example, power event data 222 may indicate that washing machine ABC has been running for 45 minutes. Power event data 222 and power event data 223 may be generated by power line sniffer 202 and data aggregator 204, respectively, in response to power information 124. For example, power line sniffer 202 may generate power event data 222 in response to power information 124 received from device 120. In another example, data aggregator 204 may generate power event data 223 in response to power information 124 received from device 118.

Classification module 206 may be implemented as hardware, or as a combination of hardware and instructions executable on the hardware. Classification module 206 may receive power event data 222, 223 from power line sniffer 202 and data aggregator 204, respectively. Additionally, classification module 206 may receive inputs from one or more sources external to message generator 102. In some examples, classification module 206 may receive input from exterior sensors or other data that may be used to process power event data 222 or power event data 223. In some examples, exterior sensors may include time sensors, weather sensors, sensors to indicate the presence or activity of people (e.g., via inertial sensors and/or infrared sensors), sensors to indicate the presence or absence of portable electronic devices, etc. For example, classification module 206 may receive profiles of a user using system 100 such as through network 112. Classification module 206 may receive sensor data as inputs through network 112 relating to an activity associated with usage of devices 116, 118, 120. Classification module 206 may generate probabilistic data via algorithms that analyze power event data 222 or power event data 223, etc. For example, classification module 206 may analyze power event data 222 illustrating that a user ran an oven for 20 minutes, and then a microwave for 5 minutes. Classification module 206 may determine that historically, when the user ran the oven and microwave for these durations, the user ate dinner and so, from a probabilistic standpoint, the user is likely eating dinner again. Classification module 206 may classify power event data 222, 223 and other inputs mentioned above, such as through sensors or from network 112, as semantic data 224 based on instructions and/or rules stored in memory 108. Semantic data 224 may be descriptive data about power information 124 and may identify an activity.

In an example where system 100 is instantiated in a household, power event data 222, 223 may identify device 118 as a television which has been operating with a characteristic power consumption profile for 5 minutes. Based on power event data 222, 223, classification module 206 may produce semantic data 224—"Watching Television." In another example, power event data 222, 223 may identify and provide power consumption profiles and duration information for several electric lights within a household. Power event data 222, 223 may indicate that a bedroom light was the final light to be turned off after several other lights were previously turned off. Based on power event data 222, 223, classification module 206 may produce semantic data 224— "Going to Bed."

In another example where system 100 is instantiated in a household, an external temperature sensor and/or an infrared sensor may provide data to classification module 206 related to an increasing temperature and/or a motion signal resulting from two people entering the household. Classification module 206 may produce semantic data 224—"Two people have entered the house" based on the rate of temperature change and based on the motion signal associated with two people entering the household.

As will be discussed in further detail below, semantic data 224 may be used to generate one or more messages 126 for social network 114. Messages 126 may be generated based on the application of one or more rules stored in memory 108. In some examples, message generator 102 may include an indicator, such as a hashtag or icon, included with messages generated for social network 114. The indicator may signify that the messages were generated by message generator 102.

In another example, semantic data 224 may be used to generate one or more messages to be sent to a content server 230 that stores content. Content server 230 may provide content in response to receipt of one or more messages. In an example, power event data 222, 223 may be used by classification module 206 to produce semantic data 224— "Grilling Steak." Semantic data 224 may be used to generate message 126 related to "Grilling Steak." Message generator 102 may send message 126 over network 112 to content server 230. Content server 230 may send advertisements and/or other content related to semantic data 224 "Grilling Steak" and/or related to message 126. For example, content server 230 may send content which suggests wine pairings for steak and/or recipes for complimentary vegetable side dishes.

Figure 3:
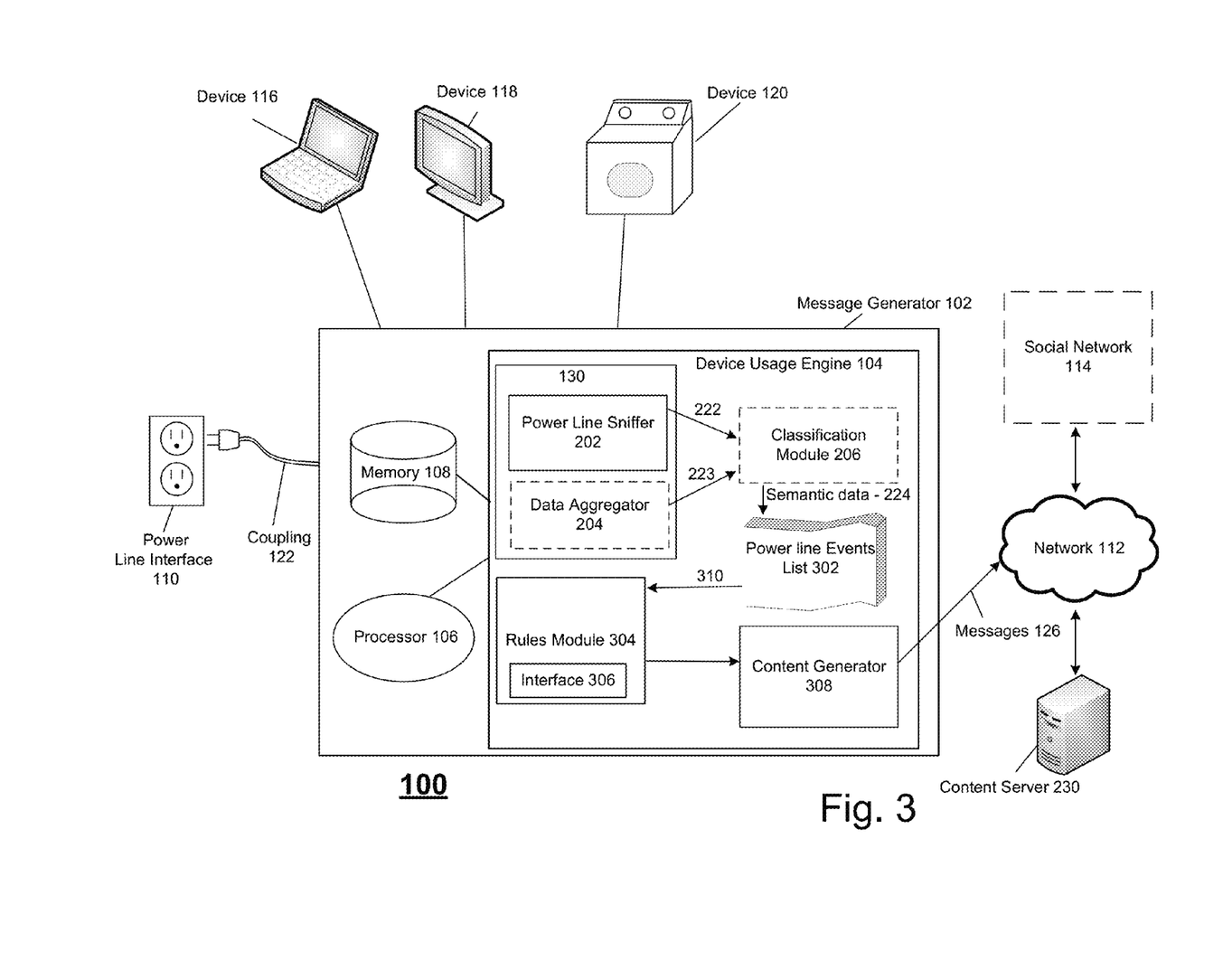
FIG. 3 depicts the example device usage message generator of FIG. 1 with further details relating to the device usage engine.

FIG. 3 depicts device usage message generator 102 with still further details relating to device usage engine 104, arranged in accordance with at least some embodiments described herein. Those components in FIG. 3 that are labeled identically to components of FIGS. 1 and 2 will not be described again for the purposes of clarity and brevity.

Device usage engine 104 may further include a rules module 304 and a content generator 308. Classification module 206 may combine semantic data 224 into a power line events list 302. Power line events list 302 may be an array, table, list, queue, or other data structure adapted to list descriptive data 310 represented by semantic data 224. Power line events list 302 may be stored in memory 108 or in another memory associated with message generator 102.

Descriptive data 310 in power line events list 302 may be accessible by rules module 304. Rules module 304 may be hardware or some combination of hardware and instructions executable on the hardware. Rules module 304 may apply one or more rules to descriptive data 310 and identify an activity associated with usage of device 116, 118, 120 in response. In some examples, descriptive data 310 may include an identification of an activity associated with usage of device 116. Rules module 304 may also provide content based on descriptive data 310 received from power line events list 302. Rules module 304 may include an interface 306. Interface 306 may allow for a user to generate and/or program new rules to provide content based on descriptive data 310. For example, a user may create a rule to be applied to a group of descriptive data 310 in power line events list 302.

In an example, descriptive data 310 of power line events list 302 may include the description "Going to bed." Rules module 304 may include a rule that may be triggered by descriptive data: "Going to bed." For example, rules module 304 may include a rule that is effective to generate a social media post: "Bedtime for Alice!" when the activity "Going to bed" is received. Content generator 308 may be hardware or some combination of hardware and instructions executable on the hardware. Content generator 308 may be configured to generate messages 126 based on the application of rules of rules module 304 to activities and/or descriptive data 310. Messages 126 may relate to an activity associated with usage of one or more of electronic devices 116, 118, and/or 120. Content generator 308 may be further configured to send messages 126 to social network 114, content server 230, and/or another device over network 112. In the example above, content generator 308 may generate and send message 126—"Bedtime for Alice!" over network 112 to social network 114. In another example, a parent may generate a rule using interface 306 so that when descriptive data 310 indicates that a television in the house is on while the parent is at work, message 126 may be generated. In the example, message 126 may be a notification which notifies the parent that the children are watching television. Message 126 may be sent to the parent as an email, SMS (short message service) message, or other notification over network 112.

Among other potential benefits, a device usage message generator in accordance with the present disclosure may automate social media posts based on power usage of electronic devices. A device usage message generator may allow a user to monitor their home or office when the user is not present. Furthermore, a device usage message generator may allow for activity-specific content to be generated based upon current activities. Additionally, data generated from power consumption monitoring may be of use to power companies and/or for data mining. In another example, resources may be provisioned based on historical demand. For example, media files for certain television shows favored by a household may be pre-positioned on a server to avoid streaming delays when an event is identified relating to the television show. Deeper and easier engagement with a social network and an increased flow of information may be realized. Fitness or healthy behavior related posts may motivate a user to ensure that such posts are consistently generated.

Figure 4:
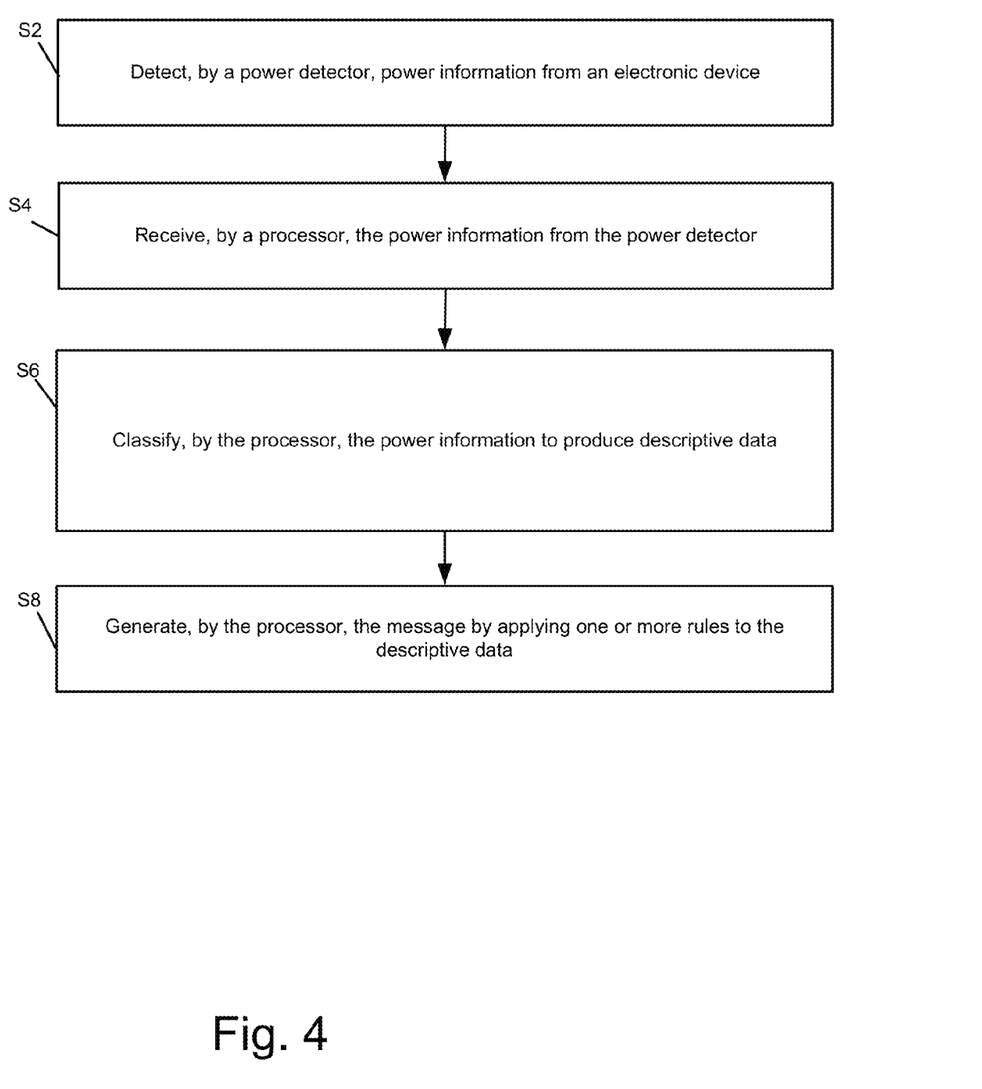
FIG. 4 depicts a flow diagram for an example process for implementing a device usage message generator.

FIG. 4 depicts a flow diagram for example process for implementing a device usage message generator, arranged in accordance with at least some embodiments described herein. In some examples, the process in FIG. 4 could be implemented using system 100 discussed above and could be used to generate one or more messages. An example process may include one or more operations, actions, or functions as illustrated by one or more of blocks S2, S4, S6, and/or S8, etc. Although illustrated as discrete blocks, various blocks may be divided into additional blocks, combined into fewer blocks, or eliminated, depending on the particular implementation. Blocks may be supplemented with additional blocks representing other operations, actions, or functions. The process in FIG. 4 may be used by a device usage message generator that includes a device usage engine, such as device usage engine 104, as described above. The device usage engine may be configured to be in communication with a processor and a memory.

Processing may begin at block S2, "Detect, by a power detector, power information from an electronic device." At block S2, a power detector may detect power information from an electronic device. Detecting power information may include detecting at least one of data from the electronic device or an analog power signal of the electronic device.

Processing may continue from block S2 to block S4, "Receive, by a processor, the power information from the power detector." At block S4, a processor may receive the power information detected by the power detector.

Processing may continue from block S4 to block S6, "Classify, by the processor, the power information to produce descriptive data." At block S6, power information may be classified by the processor to produce descriptive data. The processor may be further configured to generate probabilistic data relating to an activity associated with usage of an electronic device, such as device 118. The classification of the power information to produce descriptive data may be based on the probabilistic data.

Processing may continue from block S6 to block S8, "Generate, by the processor, the message by applying one or more rules to the descriptive data." At block S8, the processor may generate the message by applying one or more rules to the descriptive data, receive content related to the message from the content server, and output the content received from the content server. In some examples, the content may be an advertisement. The message may relate to an activity associated with usage of an electronic device. The processor may be further configured to send the message to a social network.

Figure 5:
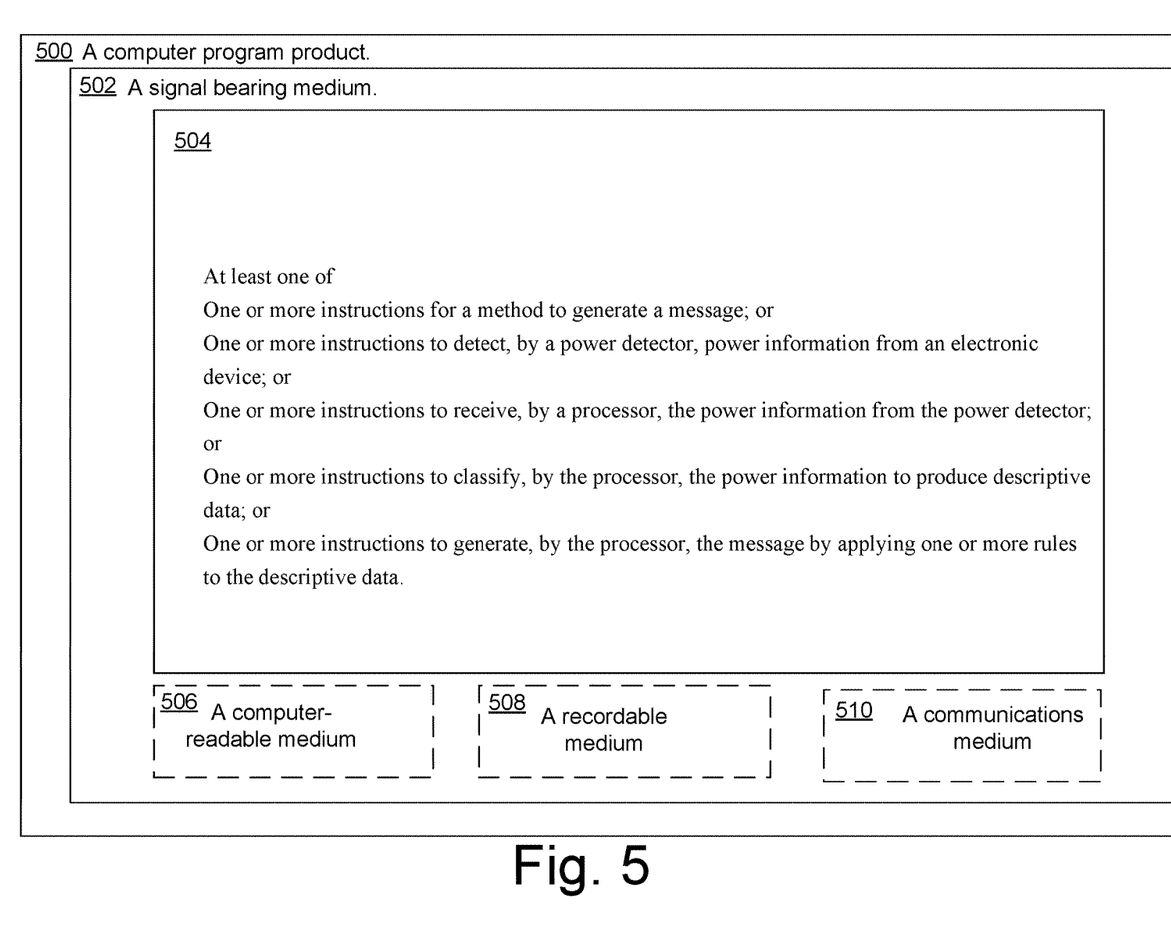
FIG. 5 illustrates an example computer program product that can be utilized to implement a device usage message generator.

FIG. 5 illustrates an example computer program product 500 that can be utilized to implement a device usage message generator arranged in accordance with at least some embodiments described herein. Computer program product 500 may include a signal bearing medium 502. Signal bearing medium 502 may include one or more instructions 504 that, in response to execution by, for example, a processor, may provide the functionality and features described above with respect to FIGS. 1-4. Thus, for example, referring to system 100, message generator 102 may undertake one or more of the blocks shown in FIG. 5 in response to instructions 504 conveyed to system 100 by signal bearing medium 502.

In some implementations, signal bearing medium 502 may encompass a computer-readable medium 506, such as, but not limited to, a hard disk drive, a Compact Disc (CD), a Digital Video Disk (DVD), a digital tape, memory, etc. In some implementations, signal bearing medium 502 may encompass a recordable medium 508, such as, but not limited to, memory, read/write (R/W) CDs, R/W DVDs, etc. In some implementations, signal bearing medium 502 may encompass a communications medium 510, such as, but not limited to, a digital and/or an analog communication medium (e.g., a fiber optic cable, a waveguide, a wired communications link, a wireless communication link, etc.). Thus, for example, computer program product 500 may be conveyed to one or more modules of the system 100 by an RF signal bearing medium 502, where the signal bearing medium 502 is conveyed by a wireless communications medium 510 (e.g., a wireless communications medium conforming with the IEEE 802.11 standard).

Figure 6:
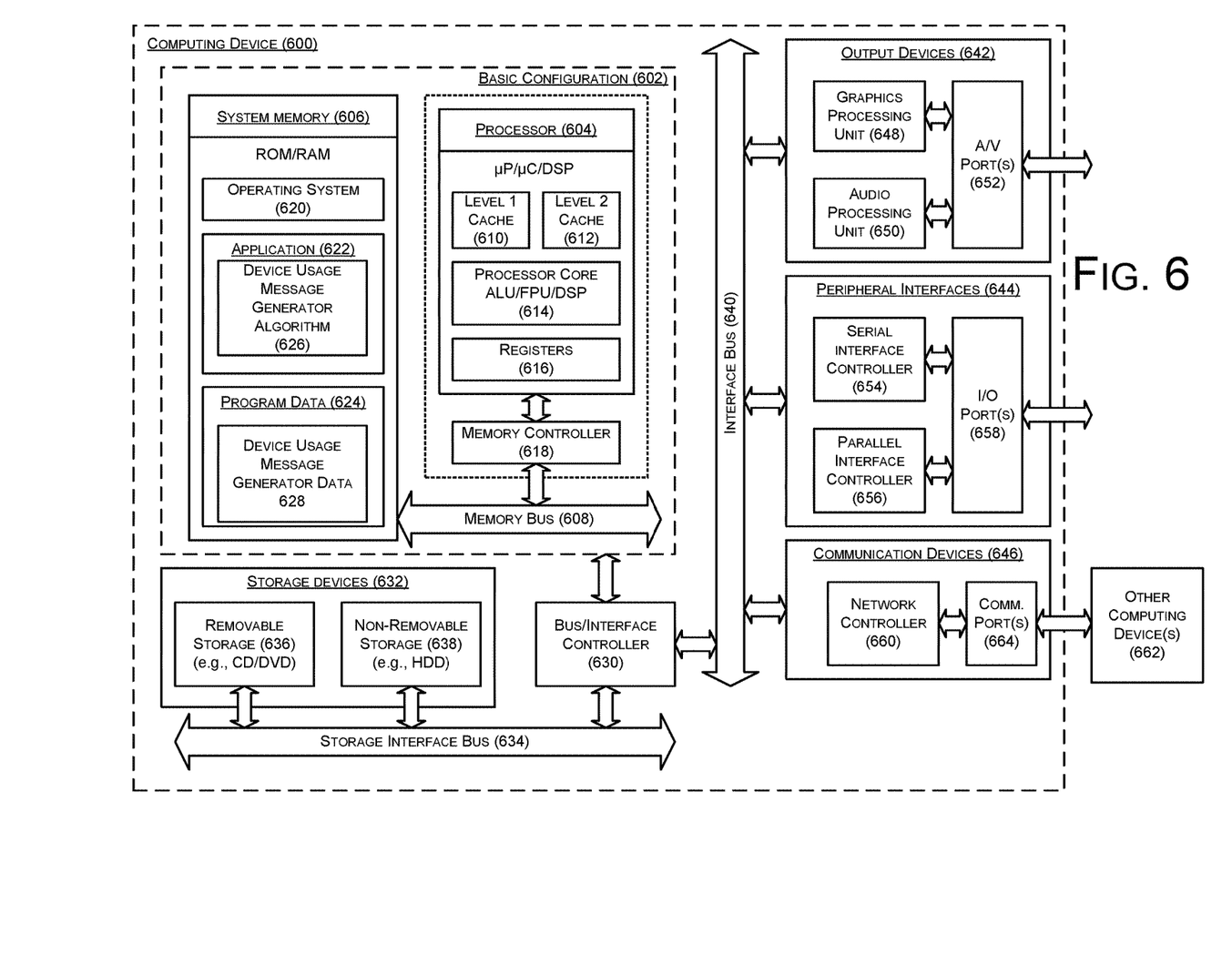
FIG. 6 is a block diagram illustrating an example computing device that is arranged to implement a device usage message generator; all arranged according to at least some embodiments described herein.

FIG. 6 is a block diagram illustrating an example computing device 600 that is arranged to implement a device usage message generator, arranged in accordance with at least some embodiments described herein. In a very basic configuration 602, computing device 600 typically includes one or more processors 604 and a system memory 606. A memory bus 608 may be used for communicating between processor 604 and system memory 606.

Depending on the desired configuration, processor 604 may be of any type including but not limited to a microprocessor (μP), a microcontroller (μC), a digital signal processor (DSP), or any combination thereof. Processor 604 may include one more levels of caching, such as a level one cache 610 and a level two cache 612, a processor core 614, and registers 616. An example processor core 614 may include an arithmetic logic unit (ALU), a floating point unit (FPU), a digital signal processing core (DSP Core), or any combination thereof. An example memory controller 618 may also be used with processor 604, or in some implementations memory controller 618 may be an internal part of processor 604.

Depending on the desired configuration, system memory 606 may be of any type including but not limited to volatile memory (such as RAM), non-volatile memory (such as ROM, flash memory, etc.) or any combination thereof. System memory 606 may include an operating system 620, one or more applications 622, and program data 624. Application 622 may include a device usage message generator algorithm 626 that is arranged to perform the functions and operations as described herein including those described with respect to FIGS. 1-5 in connection with system 100. Program data 624 may include device usage message generator data 628 that may be useful to implement a device usage message generator as is described herein. In some embodiments, application 622 may be arranged to operate in cooperation with program data 624 and/or operating system 620 such that a device usage message generator may be provided. This described basic configuration 602 is illustrated in FIG. 6 by those components within the inner dashed line.

Computing device 600 may have additional features or functionality, and additional interfaces to facilitate communications between basic configuration 602 and any required devices and interfaces. For example, a bus/interface controller 630 may be used to facilitate communications between basic configuration 602 and one or more data storage devices 632 via a storage interface bus 634. Data storage devices 632 may be removable storage devices 636, non-removable storage devices 638, or a combination thereof. Examples of removable storage and non-removable storage devices include magnetic disk devices such as flexible disk drives and hard-disk drives (HDDs), optical disk drives such as compact disk (CD) drives or digital versatile disk (DVDs) drives, solid state drives (SSDs), and tape drives to name a few. Example computer storage media may include volatile and nonvolatile, removable and non-removable media implemented in any method or technology for storage of information, such as computer readable instructions, data structures, program modules, or other data.

System memory 606, removable storage devices 636 and non-removable storage devices 638 are examples of computer storage media. Computer storage media includes, but is not limited to, RAM, ROM, EEPROM, flash memory or other memory technology, CD-ROM, digital versatile disks (DVDs) or other optical storage, magnetic cassettes, magnetic tape, magnetic disk storage or other magnetic storage devices, or any other medium which may be used to store the desired information and which may be accessed by computing device 600. Any such computer storage media may be part of computing device 600.

Computing device 600 may also include an interface bus 640 for facilitating communication from various interface devices (e.g., output devices 642, peripheral interfaces 644, and communication devices 646) to basic configuration 602 via bus/interface controller 630. Example output devices 642 include a graphics processing unit 648 and an audio processing unit 650, which may be configured to communicate to various external devices such as a display or speakers via one or more A/V ports 652. Example peripheral interfaces 644 include a serial interface controller 654 or a parallel interface controller 656, which may be configured to communicate with external devices such as input devices (e.g., keyboard, mouse, pen, voice input device, touch input device, etc.) or other peripheral devices (e.g., printer, scanner, etc.) via one or more I/O ports 658. An example communication device 646 includes a network controller 660, which may be arranged to facilitate communications with one or more other computing devices 662 over a network communication link via one or more communication ports 664.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 600 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 600 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope. Functionally equivalent methods and apparatuses within the scope of the disclosure, in addition to those enumerated herein, will be apparent from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

In general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). If a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

For any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments are possible. The various aspects and embodiments disclosed herein are for purposes of illustration and are not intended to be limiting, with the true scope and spirit being indicated by the following claims.

What is claimed is:

1. A message generator comprising:
   a processor;
   a power detector configured to be in communication with the processor; and
   a memory configured to be in communication with the processor, the memory effective to store instructions;
   the power detector effective to:
      detect power information indicative of power consumption by an electronic device; and
      send the power information to the processor;
   the processor effective to:
      classify the power information in response to the instructions stored in the memory to produce descriptive data about an activity associated with the use of the electronic device, wherein the activity is derived from the usage of the electronic device; and
      apply one or more rules to the descriptive data to generate the message.

2. The message generator of claim 1, wherein the processor is further effective to:
   send the message to a content server;
   receive content related to the message from the content server; and
   output the content.

3. The message generator of claim 1, wherein the power detector is effective to detect power information indicative of power consumed by the electronic device through receipt of data from the electronic device.

4. The message generator of claim 1, wherein the power detector is effective to detect power information indicative of power consumption by the electronic device through detection of an analog power signal of the electronic device.

5. The message generator of claim 1, wherein:
   the power detector is effective to detect power information indicative of power consumption by the electronic device; and
   the power information comprises at least one of an impulse response and an inductive ringing characteristic of the electronic device.

6. The message generator of claim 1, wherein the message includes the activity associated with use of the electronic device.

7. The message generator of claim 6, wherein the processor is further effective to send the message to a social network.

8. The message generator of claim 7, wherein the processor is further effective to:
   generate an indicator, wherein the indicator signifies that the message was generated by the message generator; and
   send the indicator to the social network with the message.

9. A method to generate a message, the method comprising:

detecting, by a power detector, power information indicative of power consumption by an electronic device;

receiving, by a processor, the power information from the power detector;

classifying, by the processor, the power information to produce descriptive data about an activity associated with the use of the electronic device, wherein the activity is derived from the usage of the electronic device; and generating, by the processor, the message by applying one or more rules to the descriptive data.

10. The method of claim 9, further comprising, by the processor:

sending the message to a content server;

receiving content related to the message from the content server; and outputting the content.

11. The method of claim 10, wherein the content is an advertisement.

12. The method of claim 9, wherein detecting the power information includes detecting at least one of data from the electronic device or an analog power signal of the electronic device.

13. The method of claim 9, wherein the message relates to the activity associated with the use of the electronic device.

14. The method of claim 13, further comprising sending the message to a social network.

15. The method of claim 9, further comprising, by the processor:

generating probabilistic data relating to the activity associated with the use of the electronic device; and wherein classifying the power information to produce descriptive data is based on the probabilistic data.

16. A method to generate content based on power information, the method comprising:

detecting, by a power detector, the power information indicative of power consumption by an electronic device;

classifying, by a processor, the power information to produce descriptive data about an activity associated with the use of the electronic device, wherein the activity is derived from the usage of the electronic device;

applying, by the processor, one or more rules to the descriptive data;

identifying, by the processor, the activity based on the application of the one or more rules to the descriptive data;

sending, by the processor, an indication of the activity to a content server configured to be in communication with the processor; and receiving, by the processor from the content server, content related to the activity.

17. The method of claim 16, further comprising sending the content to a computing device that is different from the processor.

18. The method of claim 17, wherein the content is an advertisement related to the activity.

19. The method of claim 16, wherein detecting the power information includes detecting at least one of data from the electronic device or an analog power signal of the electronic device.

20. The method of claim 16, further comprising, by the processor:

generating probabilistic data relating to the activity associated with the use of the electronic device; and wherein classifying the power information to produce descriptive data is based on the probabilistic data.

* * * * *

UNITED STATES PATENT AND TRADEMARK OFFICE
CERTIFICATE OF CORRECTION

PATENT NO. : 9,575,534 B2
APPLICATION NO. : 14/391640
DATED : February 21, 2017
INVENTOR(S) : Kruglick Page 1 of 2

It is certified that error appears in the above-identified patent and that said Letters Patent is hereby corrected as shown below:

On the Title Page

In Item (74), under "Attorney, Agent, or Firm", in Column 2, Lines 1-2, delete "Morritt Hock & Hamroff LLP;" and insert -- Moritt Hock & Hamroff LLP; --, therefor.

In the Drawings

Replace Sheet 3 of 6, Fig. 3 with new Sheet 3 of 6, Fig. 3.

In the Specification

In Column 1, Line 9, delete "§371" and insert -- § 371 --, therefor.

In Column 1, Line 10, delete "filed Mar. 18, 2014," and insert -- filed on Mar. 18, 2014, --, therefor.

In Column 6, Line 12, delete "off Based" and insert -- off. Based --, therefor.

Signed and Sealed this
Second Day of May, 2017

Michelle K. Lee
*Director of the United States Patent and Trademark Office*